(12) United States Patent
Li et al.

(10) Patent No.: US 11,508,148 B2
(45) Date of Patent: Nov. 22, 2022

(54) AUTOMATIC MAKEUP TRANSFER USING SEMI-SUPERVISED LEARNING

(71) Applicant: Adobe Inc., San Jose, CA (US)

(72) Inventors: Yijun Li, Seattle, WA (US); Zhifei Zhang, San Jose, CA (US); Richard Zhang, San Francisco, CA (US); Jingwan Lu, Santa Clara, CA (US)

(73) Assignee: ADOBE INC., San Jose, CA (US)

( * ) Notice: Subject to any disclaimer, the term of this patent is extended or adjusted under 35 U.S.C. 154(b) by 261 days.

(21) Appl. No.: 16/822,878

(22) Filed: Mar. 18, 2020

(65) Prior Publication Data
US 2021/0295045 A1     Sep. 23, 2021

(51) Int. Cl.
| | |
|---|---|
| G09G 5/00 | (2006.01) |
| G06V 20/20 | (2022.01) |
| G06K 9/62 | (2022.01) |
| G06N 3/04 | (2006.01) |
| G06N 3/08 | (2006.01) |
| G06V 10/56 | (2022.01) |
| G06V 40/50 | (2022.01) |
| G06V 40/16 | (2022.01) |

(52) U.S. Cl.
CPC .......... *G06V 20/20* (2022.01); *G06K 9/6253* (2013.01); *G06K 9/6259* (2013.01); *G06K 9/6262* (2013.01); *G06N 3/0454* (2013.01); *G06N 3/088* (2013.01); *G06V 10/56* (2022.01); *G06V 40/171* (2022.01); *G06V 40/50* (2022.01)

(58) Field of Classification Search
CPC ....... G06T 19/00; G06T 19/006; G06T 17/00; H04N 5/272; A63F 13/10
USPC .......................................................... 345/632
See application file for complete search history.

(56) References Cited

U.S. PATENT DOCUMENTS

| | | | |
|---|---|---|---|
| 2018/0276883 A1* | 9/2018 | D'Alessandro | ......... G06T 17/20 |
| 2019/0014884 A1* | 1/2019 | Fu | ......... G06T 1/0007 |
| 2021/0279956 A1* | 9/2021 | Chandran | ............... G06T 17/20 |

OTHER PUBLICATIONS

FaceApp: https://www.faceapp.com/, 2020, 5 pages.
Chang, Huiwen, et al., "PairedCycleGAN: Asymmetric style transfer for applying and removing makeup", In Proceedings of the IEEE Conference on Computer Vision and Pattern Recognition, 2018, pp. 40-48.

(Continued)

*Primary Examiner* — Gordon G Liu
(74) *Attorney, Agent, or Firm* — F. Chau & Associates, LLC

(57) ABSTRACT

The present disclosure relates to systems, computer-implemented methods, and non-transitory computer readable medium for automatically transferring makeup from a reference face image to a target face image using a neural network trained using semi-supervised learning. For example, the disclosed systems can receive, at a neural network, a target face image and a reference face image, where the target face image is selected by a user via a graphical user interface (GUI) and the reference face image has makeup. The systems transfer, by the neural network, the makeup from the reference face image to the target face image, where the neural network is trained to transfer the makeup from the reference face image to the target face image using semi-supervised learning. The systems output for display the makeup on the target face image.

20 Claims, 9 Drawing Sheets

(56) References Cited

OTHER PUBLICATIONS

Goodfellow, Ian J., et al., "Generative adversarial nets. In Advances in neural information processing systems", In NIPS, 2014, pp. 2672-2680.

Li, Tingting, et al., "BeautyGAN: Instance-level facial makeup transfer with deep generative adversarial network", In Proceedings of the 26th ACM international conference on Multimedia, Oct. 22-26, 2018, pp. 645-653.

Liu, Si, et al., "Makeup like a superstar: Deep localized makeup transfer network", arXiv preprint arXiv:1604.07102, Apr. 25, 2016, 7 pages.

\* cited by examiner

AUTOMATIC MAKEUP TRANSFER USING SEMI-SUPERVISED LEARNING

TECHNICAL FIELD

This description relates to automatic makeup transfer using semi-supervised learning.

BACKGROUND

A virtual makeup transfer application illustrates how makeup on a reference face image would transfer and look onto a target face image, such as a user's own face image, while preserving face identity. The application may transfer the makeup style, including cosmetic elements such as lipstick and eyeliner (or eyeshadow), from the reference face image to the target face image.

Conventional approaches have developed techniques and applications using trained models to perform such a virtual makeup transfer. Conventional applications to transfer makeup provide poor results by not maintaining the skin tone of the target face image around the facial components where the makeup is transferred and the reference face image having the makeup is an arbitrary face image, meaning that the reference face image is not a pre-selected image used to train the underlying model. In order to achieve more desirable results, users of such conventional applications are limited to using stock reference face images that were used to train the underlying model. Conventional applications also provide the user limited control and selectivity of the reference image facial components because the applications are limited to transfer of makeup from the facial components of a single image.

Additionally, conventional applications to transfer makeup have only used models trained using unsupervised learning models. Conventional applications to transfer makeup have not used models trained using supervised learning models because of the difficulties training the model in using such techniques. For example, the supervised learning models require a large amount of paired data, meaning that the inputs to the model must be a same identity and a same alignment with one image having makeup data and one image having no-makeup data. A further disadvantage of training using a supervised learning approach a third image is required to be the ground truth image. The large amount of paired data requires a third ground truth image having the same identity and the same alignment as the image having no-makeup, but with the makeup on. Problems arise and disadvantages result because such a ground truth image may not exist for the large amount of paired data required to fully train the model. Additionally, it may be too time consuming and inefficient to prepare the large amount of ground truth images required to fully train the model using supervised learning. Due to the difficulties in training a model using supervised learning, conventional applications to transfer makeup have solely used models trained only using unsupervised learning. Applications that used models only trained using unsupervised learning experience issues with inefficient color transfer of the makeup and unsatisfying makeup transfer results.

In contrast to supervised learning, unsupervised learning is much easier to train the model. In some conventional approaches, the trained models are fully, unsupervised learning models, where the models are trained using two inputs consisting of two, randomly paired images from different identities (i.e., different faces) with one image having makeup data and one image having no-makeup data. Using a large amount of randomly paired images from different identities is easier than using a large set of three paired images having a same identity and a same alignment. However, the approach of using only unsupervised learning also has disadvantages and drawbacks. In some conventional approaches, the two input images are required to be aligned so that the facial feature correspondence (e.g., eye-to-eye) between the randomly paired image can be precisely found. During training of the model, the requirement to have the two input images aligned is impractical and disadvantageous because the reference face image for the randomly paired images might be in a totally different pose than the target face image. This impracticality can lead to inefficiencies and problems with the model training.

In other conventional approaches to improve the training of using only unsupervised learning, cycle-consistent adversarial networks are employed where two networks, a makeup transfer network and a makeup removal network, are utilized. Like other conventional approaches, both networks are trained using fully, unsupervised learning (realized by adversarial losses) only. However, in such an approach, the network training still results in some disadvantages. For example, the network training tends to be unstable and the makeup transfer results are unsatisfying with problems such as the color from the reference face image not being fully transferred to the target face image. Additionally, conventional approaches using two networks has the disadvantage of having to learn/train two networks, which is more time consuming and more difficult than learning/training a single network.

Finally, some conventional applications provide for makeup transfer; however, these conventional applications have disadvantages because they provide a limited number of reference makeup examples (or templates) and do not support users to upload their own makeup.

Thus, there are several disadvantages with regard to conventional makeup transfer systems and techniques.

SUMMARY

The present disclosure relates to systems, computer-implemented methods, and non-transitory computer readable medium for automatically transferring makeup from a reference face image to a target face image using a neural network trained using semi-supervised learning. For example, the disclosed systems can receive, at a neural network, a target face image and a reference face image, where the target face image is selected by a user via a graphical user interface (GUI) and the reference face image has makeup. The systems transfer, by the neural network, the makeup from the reference face image to the target face image, where the neural network is trained to transfer the makeup from the reference face image to the target face image using semi-supervised learning. The systems output for display the makeup on the target face image.

The neural network is trained using the semi-supervised learning by i) training the neural network using only the paired data using supervised learning and then ii) iteratively training the neural network using subsets of the unpaired data using unsupervised learning.

The details of one or more implementations are set forth in the accompanying drawings and the description below. Other features will be apparent from the description and drawings, and from the claims.

DETAILED DESCRIPTION

One or more implementations described in this document provide benefits and solve one or more of the foregoing or other problems in the art with a system and techniques for automatically transferring makeup from a reference face image having the makeup to a target face image having no makeup using a neural network that is trained via semi-supervised learning. The semi-supervised trained network is trained using a combination of supervised learning and unsupervised learning. Only a relatively small amount of paired data is used to first train the network in a supervised manner. By using just a relatively small amount of paired data in supervised learning, the benefits of initialization of the network using paired data that is aligned can be realized while avoiding the disadvantages encountered when trying to fully train the model using supervised learning. In part, the disadvantages are avoided because only a relatively small amount of ground truth images need to be used and/or created. This also overcomes some disadvantages of fully unsupervised training where the randomly paired images may not align at all.

Figure 1:
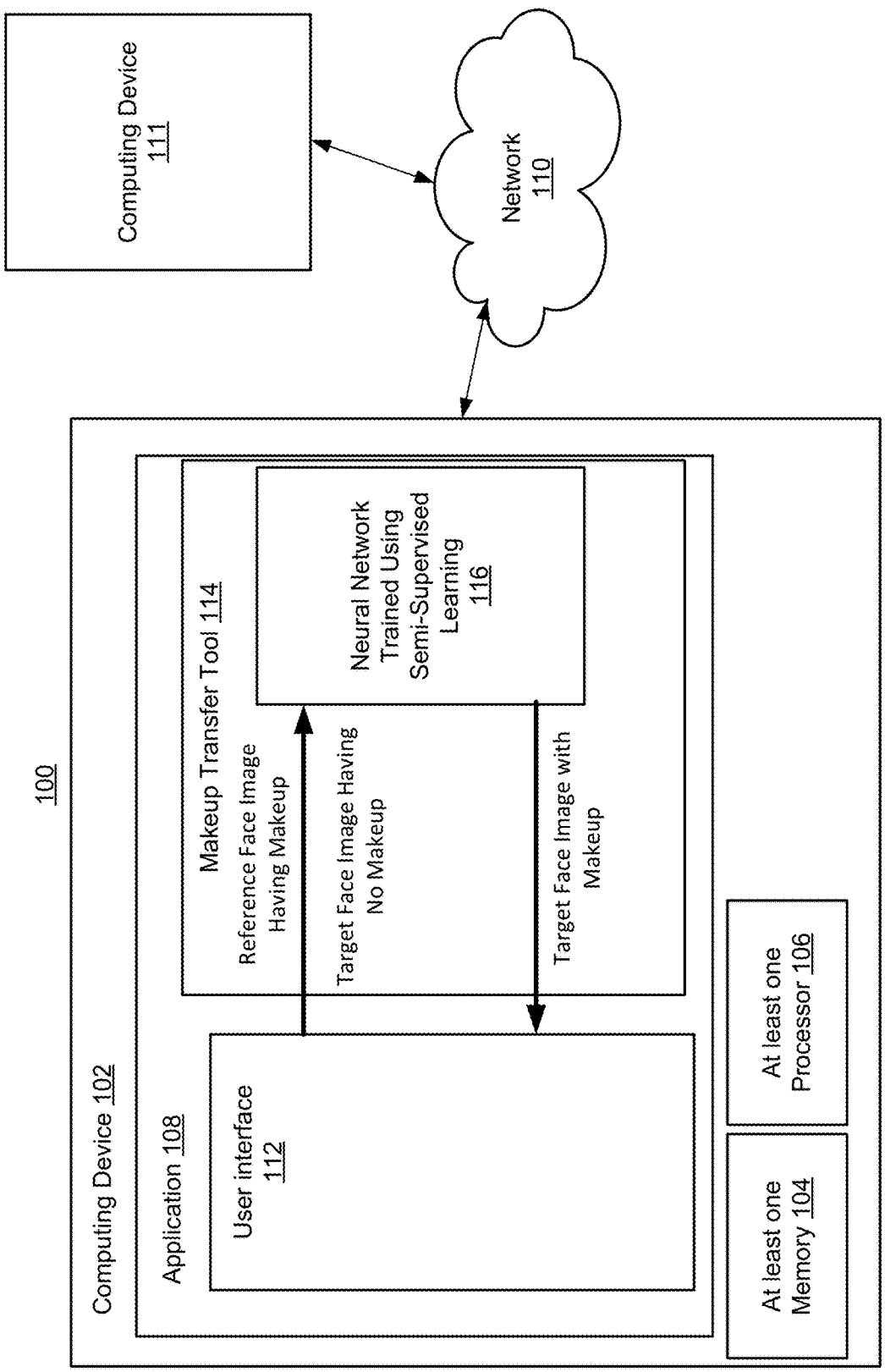
FIG. 1 is a block diagram of a system for transferring makeup from a reference face image to a target face image.
Figure 2:
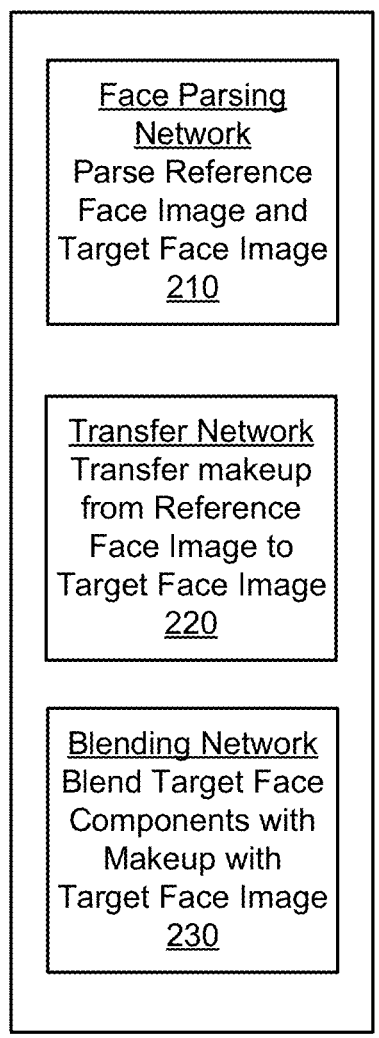
FIG. 2 is a block diagram illustrating example operations of the neural network of FIG. 1.

In this manner, an application that uses a model trained using a combination approach of supervised learning and unsupervised learning (i.e., semi-supervised learning) achieves better makeup transfer results as illustrated in tests depicted and described later in this document. Those results illustrate a much better and reliable transfer of the makeup data, including and especially the color, using the semi-supervised trained model in the application. Further, the model itself uses less memory and less processing power than models trained in both directions (makeup application and makeup removal) using unsupervised learning. Thus, the application using such a model can be implemented on all types of computing devices (e.g., mobile and non-mobile) and run smoothly and efficiently while achieving better results than conventional applications. FIGS. 1 and 2 describe in detail how such an application works to transfer the makeup from a reference image to a target image using a model trained by semi-supervised learning.

Additionally, an application having a model trained using semi-supervised learning better maintains the skin tone of the target face image around the facial components that received the transferred makeup from the reference face image in comparison to conventional applications trained using other learning techniques. Further, the application provides more user control to select any reference face image having makeup including an arbitrary face image, where the arbitrary face image is not a pre-selected reference face image that was used to train the model. Moreover, the user can select facial components with makeup from multiple, different reference face images to transfer to the target image. For example, the user can select the makeup from the eyes of one reference face image and the makeup from the lips of a different reference face image to transfer to the target face image.

In general, for example, the neural network is trained by applying a semi-supervised learning technique using a relatively small number of paired data of face images having a same identity and a same alignment and a relatively large number of unpaired data of randomly paired face images having different identities and potentially different alignments from each other. By training the neural network using a semi-supervised learning approach of both paired data and unpaired date, the neural network is better stabilized than conventional approaches that use only unsupervised training techniques to train the neural network. Additionally, the neural network trained via the semi-supervised learning realizes and achieves better makeup transfer effects from the reference face image to the target face image compared to conventional neural networks trained using only unsupervised learning.

The semi-supervised learning technique is further enhanced by using an incremental training strategy to progressively drive the neural network learning different makeup styles. For example, the neural network is first trained with the relatively small number of paired data only using supervised learning. First training the neural network with the paired data using supervised learning leads to a good initialization of the neural network compared to the neural network having to start learning from scratch. The good initialization obtained by using the paired data only provides the benefit of stabilizing the training for the next phase when the unpaired data are used to train the neural network.

Following the initialization of the neural network using only the paired data, the neural network is gradually trained further using subsets of the relatively large number of unpaired data. For instance, the number of unpaired data may be grouped into subsets of unpaired data and each subset is progressively input into the neural network to further train the neural network. While the amount of paired data and unpaired data is substantially imbalanced due to the relatively large number of unpaired data compared to the relatively small number of paired data, the incremental training strategy is demonstrated to be more effective than simply putting all paired data and unpaired data together for training.

Further, the neural network is trained using the semi-supervised learning in one single-direction meaning the neural network is trained to transfer makeup to a target face image having no makeup. That is, the neural network is trained to transfer makeup on a target face image from having no-makeup to having makeup. Unlike conventional techniques which train two neural networks, one for makeup transfer and one for makeup removal from a face image, together using fully, unsupervised learning, the semi-supervised learning techniques described herein train the neural network in one single-direction, which is a more efficient and simpler system that achieves much better makeup transfer results than the conventional techniques. The semi-supervised learning techniques for training the neural network for makeup transfer require less memory resources and less processing resources than the conventional techniques, all while providing improved makeup transfer results.

Additionally, implementations include using the trained neural network trained via the semi-supervised learning techniques in an application that enables a user to transfer makeup from a reference face image having makeup to a target face image having no makeup. The system and techniques enable the user options to input just the target face image on which to transfer the makeup from a known or system-provided reference face image or to input both the target face image and the reference face image. Thus, these options are an improvement over conventional makeup transfer applications, which may enable the user only to input the target face image and not the reference face image.

As illustrated by the foregoing discussion, the present disclosure utilizes a variety of terms to describe features and benefits of an automatic makeup transfer system using a neural network trained via semi-supervised learning. Additional detail is provided regarding the meaning of these terms as used in this disclosure. In particular, the term "neural network" refers to a trainable computer-based algorithm that analyses data to perform a function, such as making predictions including making predictions for transferring makeup from a reference face image having the makeup to a target face image having no makeup. A neural network can refer to a tunable model that is trained to make predictions based on training data. In particular, a neural network includes a computer-implemented algorithm that analyses input (e.g., training data) to improve in accuracy by modifying internal parameters for subsequent predictions. In some implementations, the neural network is trained using semi-supervised learning. In the same or other implementations, a neural network can be a convolutional neural network (CNN) and/or a deep neural network.

Relatedly, the term "train" or "learn" refers to utilizing information to tune or teach a neural network. The term "training" or "learning" (used as an adjective or descriptor, such as "training data" or "learning data") refers to information or data utilized to tune or teach the model. In some implementations, the system and techniques described herein trains one or more neural networks to automatically and accurately transfer makeup from a reference face image to a target face image based on respective training data.

As used herein, the term "semi-supervised learning" refers to the training of a neural network using both paired data and unpaired data with the paired data used to train the network using supervised learning and the unpaired data used to train the network using unsupervised learning. As used herein, the term "paired data" refers to training data that is used to train the neural network that includes three selected images having a same identity and a same alignment, where the selected images include a training reference face image with makeup, a training target face image without makeup, and the training target face image with the makeup. As used herein, the term "unpaired data" refers to training data that is used to train the neural network that includes two randomly selected images that may have a different identity and may have a different alignment, where the randomly selected images include a reference face image with makeup and a training target face image without makeup.

As used herein, the term "supervised learning" refers to the training of a neural network using labelled data, such as paired data, to train the network. A supervised learning technique takes a known set of input dataset and its known responses to the data (output) to learn the model and trains the model to generate a prediction for the response to new data.

As used herein, the term "unsupervised learning" refers to the training of a neural network using unlabelled data, such as unpaired data, to train the network. In unsupervised learning techniques the responses to the set of input dataset is unknown.

As referenced above, a neural network is trained to automatically transfer makeup from a reference face image having the makeup to a target face image having no makeup. As used herein, the term "makeup" refers to cosmetics such as lipstick, eyeliner, eyeshadow, powder, or other cosmetics applied to the face used to enhance or alter the appearance of the face. The makeup also may be referred to as virtual makeup because the systems and techniques described in this document enable a user to load a target face image into an application to view what the makeup on a reference face image virtually looks like on the target face image.

As used herein, the term "reference face image" refers to an image of a face having makeup on the face, where the makeup on face is desired to be viewed on a different face referred to as a target face image. In some implementations, the reference face image may be provided as part of an application that includes the neural network to transfer the makeup from the reference face image to the target face image. In some implementations, the reference face image may be provided by a user and input into the application that includes the neural network to transfer the makeup from the reference face image to the target face image. As used herein, an "arbitrary face image" refers to any image that is not one of a set of pre-selected images used to train the neural network. As used herein, "training reference face image" includes the same definition as "reference face image" above and that the image is used as part of the training of the neural network.

As used herein, the term "target face image" refers to an image of a face having no makeup on the face, where it is desired to view makeup on the face from a reference face image having the makeup. For example, a user may upload an image of their own face without makeup and input it into the application having the neural network so the user can view what their face looks like with makeup that is transferred from a reference face image having the makeup to their face. Of course, any face image without makeup may be used as the target face image. For instance, the user may input a face image other than their own face image into the application having the neural network in order to view makeup from a reference face image on the face image input by the user as the target face image. As used herein, "training target face image" includes the same definition as "target face image" above and that the image is used as part of training the neural network.

A neural network can have a particular architecture. For example, a neural network can be composed of multiple layers. As used herein, the term "layer" refers to a collection of nodes or neurons of the neural network. In particular, a layer can refer to a portion or section of a neural network that includes one or more neurons or other analytical units. Within a neural network, adjacent layers can communicate with each other, passing information between constituent nodes within the layers in a forward propagation of information and/or back propagation of information. A neural network can include a variety of different layers, such as an input layer, a convolutional layer, a hidden layer, a pooling layer (e.g., a dense pooling layer), an extraction layer, a filter layer (e.g., a low-pass filter layer), a downsampling layer, or an output layer.

Additional detail regarding the system and techniques for automatically transferring makeup from a reference face image to a target face image will now be provided with reference to the figures. For example, FIG. 1 is a block diagram of a system 100 for transferring makeup from a reference face image to a target face image. The system 100 automatically transfers makeup from a reference face image to a target face image using a neural network that has been trained using semi-supervised learning.

The system 100 includes a computing device 102 having at least one memory 104, at least one processor 106 and at least one application 108. The computing device 102 may communicate with one or more other computing devices over a network 110. For instance, the computing device 102 may communicate with a computing device 111 over the network 110. The computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple computing devices in communication with one another, such as multiple servers in communication with one another being utilized to perform its various functions over a network.

The at least one processor 106 may represent two or more processors on the computing device 102 executing in parallel and utilizing corresponding instructions stored using the at least one memory 104. The at least one processor 106 may include a graphics processing unit (GPU) and/or a central processing unit (CPU). The at least one memory 104 represents a non-transitory computer-readable storage medium. Of course, similarly, the at least one memory 104 may represent one or more different types of memory utilized by the computing device 102. In addition to storing instructions, which allow the at least one processor 106 to implement the application 108 and its various components, the at least one memory 104 may be used to store data, such as one or more of the target face images with no makeup and reference face images with makeup used by the application 108, as well as the output of the application 108 including the target face images with the makeup.

The network 110 may be implemented as the Internet, but may assume other different configurations. For example, the network 110 may include a wide area network (WAN), a local area network (LAN), a wireless network, an intranet, combinations of these networks, and other networks. Of course, although the network 110 is illustrated as a single network, the network 110 may be implemented as including multiple different networks.

The application 108 may be accessed directly by a user of the computing device 102. In other implementations, the application 108 may be running on the computing device 102 as a component of a cloud network, where a user accesses the application 108 from another computing device over a network, such as the network 110. In one implementation, the application 108 may be a graphic design-type application or simply a design application. The application 108 may include features that allow users to upload a target face image and a reference face image to automatically transfer makeup from the reference face image to the target face image to see what the makeup from the reference face image looks like on the target face image. The application 108 allows the user to input just the target face image or both the target face image and the reference face image. Additionally, the application 108 allows the user to input more than one reference face image to enable the user to select makeup to transfer from different facial components using different reference face images. The application may be a standalone application that runs on the computing device 102. Alternatively, the application 108 may be an application that runs in another application such as a browser application.

The application 108 includes a user interface 112 (also referred to interchangeably as a graphical user interface or GUI), which includes an area to enable the user to select and upload face images including target face images and reference face images. The user interface 112 includes controls to enable the user to upload more than one reference face image and to select makeup to transfer from the facial component of one reference face image and select makeup to transfer from a different facial component of a different reference face image. One of the many tools of the application 108 includes a makeup transfer tool 114, which also may be referred to as a virtual transfer tool. In some implementations, the face images may be stored in at least one memory 104 and the user interface 112 may access the stored face images for viewing, selection, and input into the makeup transfer tool 114. In some implementations, the face images may be stored in a data storage device (not shown) on a different computing device, such as the computing device 111. The user interface 112 may access, view, and select the faces images stored on the computing device 111 over the network 110. In some implementations, the face images may be captured by an image capture device (not shown) such as, for example, a camera. The image capture device may capture the face image and the image may be transferred to the user interface 112 for viewing, selection, and inputting into the makeup transfer tool 114. The makeup transfer tool 114 may be launched or selected from the user interface 112.

The makeup transfer tool 114 is an application tool that automatically transfers makeup from one image (e.g., a reference face image) to another image (e.g., a target face image). In this manner, the makeup transfer tool 114 enables a user to load a target face image having no makeup into an application to view what the makeup on a reference face image virtually looks like on the target face image. The makeup transfer tool 114 includes a neural network 116 that has been trained using semi-supervised learning. The semi-supervised learning aspects of the neural network 116 are discussed in greater detail below. The neural network 116 receives as input a target face image and a reference face image.

As used herein, the term "reference face image" refers to an image of a face having makeup on the face, where the makeup on face is desired to be viewed on a different face referred to as a target face image. In some implementations, the reference face image may be provided as part of an application 108 that includes the neural network 116 to transfer the makeup from the reference face image to the target face image. In some implementations, the reference face image may be provided by a user and input into the application 108 using the user interface 112 that includes the neural network 116 to transfer the makeup from the reference face image to the target face image. A reference face image provided by the user may be referred to as an arbitrary face image. As used herein, an "arbitrary face image" refers to any image that is not one of a set of pre-selected images used to train the neural network. The user is provided control and selectivity to use any reference face image that has makeup and is not limited to using pre-selected, stock reference face images that were used to train the network and that are known to work with the application. Instead, the user may select and use an arbitrary face image as the reference face image and still obtain desirable makeup transfer results even though the arbitrary face image selected by the user is not one that was used to train the network.

As used herein, the term "target face image" refers to an image of a face having no makeup on the face, where it is desired to view makeup on the face from a reference face image having the makeup. For example, a user may upload an image of their own face without makeup and input it into the application 108 having the neural network 116 so the user can view what their face looks like with makeup that is transferred from a reference face image having the makeup to their face. Of course, any face image without makeup may be used as the target face image. For instance, the user may input a face image other than their own face image into the application 108 having the neural network 116 in order to view makeup from a reference face image on the face image input by the user as the target face image.

The neural network 116 processes the received reference face image having the makeup to transfer the makeup to the target face image and outputs the makeup on the target face image for display on the user interface 112 in the application 108. More specifically, in some implementations, the neural network 116 is configured to transfer make from one or more facial components of the reference face image to one or more corresponding facial components of the target face image. For example, the one or more facial components may include the following regions: right eye, left eye, lip, nose, right ear, left ear, right cheek, left cheek, and other regions. The neural network 116 may include one or more networks that work together to automatically transfer the makeup from one face image to another face image.

Referring also to FIG. 2, the neural network 116 of FIG. 1 is illustrated in additional detail showing the additional components used to transfer the makeup from the reference face image to the target face image. The neural network 116 includes a face parsing network 210, a transfer network 220, and a blending network 230. Each of these components 210, 220, and 230 may be a machine learning component such as a neural network, a deep neural network, a convolutional neural network, etc.

The face parsing network 210 is configured to parse both the reference face image and the target face image into one or more facial components. In some implementations, the face parsing network 210 is a trained neural network that is capable or parsing the face images into multiple (e.g., 11) different facial components. In some implementations, the face parsing network 210 is implemented as a trained neural network that parses the face image and outputs only the desired facial components for the purposes of transferring makeup for these facial components. For instance, the face parsing network 210 parses the reference face image and the target face image to output the right eye region, the left eye region, and the lip region for both the reference face image and the target face image.

The face parsing network 210 may generate a mask to identify or recognize the different components of the face. The face parsing network 210 is trained using labelled (e.g., human labelled) face images where the facial components are labelled. The results of the face parsing network 210 are output as cropped facial components including the cropped right eye region, left eye region, and lip region for both the reference face image and the target face image. The output of the cropped facial regions may be an image of the same size where every pixel includes a solid color that indicates which region the pixel belongs to. The face parsing network 210 communicates the output to the transfer network 220.

The transfer network 220 includes a trained neural network that is trained using semi-supervised learning to transfer the makeup from the reference face image facial components to the target face image facial components. The transfer network 220 is trained using the semi-supervised learning such that the skin tone on the target face image around the facial components is maintained without gaps or blemishes between the transferred makeup and the target face image skin around the facial component. In some implementations, the transfer network 220 includes a trained neural network for each of the different facial components such as a trained neural network for the right eye region, a trained neural network for the left eye region, and a trained neural network for the lip region. In some implementations, the right eye region and the left eye region may use a same trained neural network that has been trained for each of the eye regions. The details regarding the training of the transfer network 220 are provided in additional detail below. In some implementations, the transfer network 220 uses a generator architecture that receives the parsed facial region of the reference face image and the target face image as input.

Figure 3:
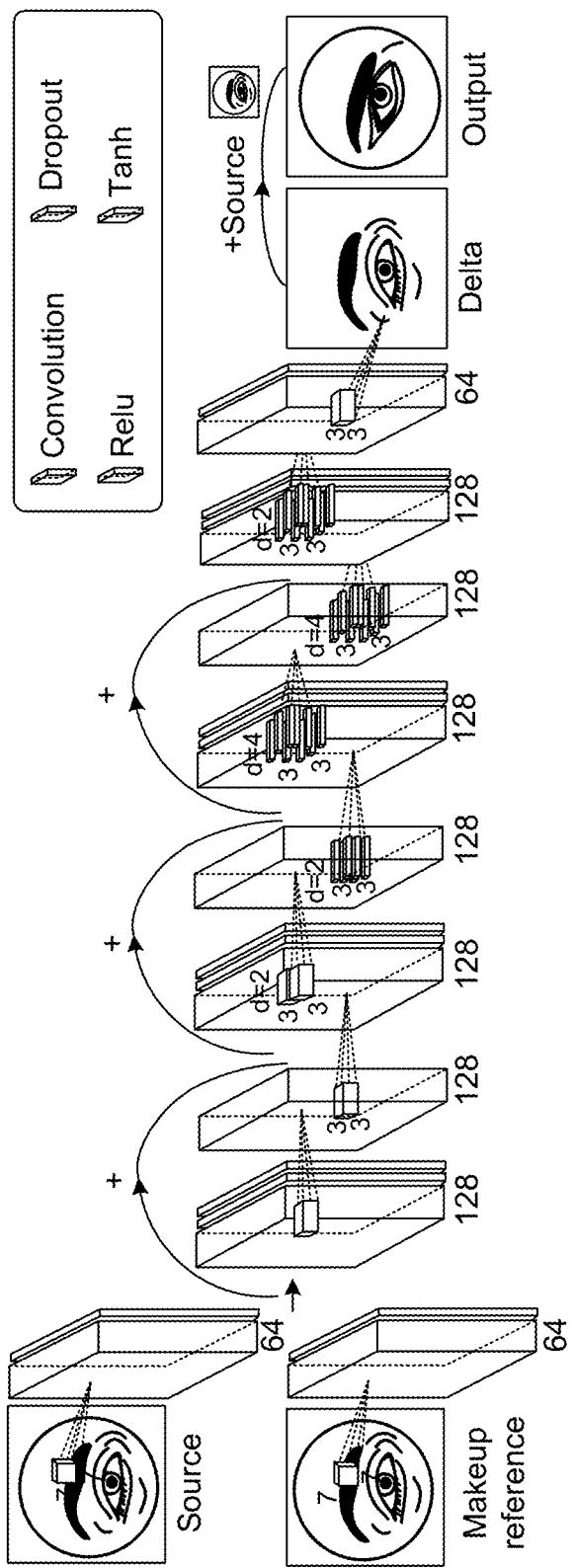
FIG. 3 is a block diagram illustrating an example architecture of the transfer network of FIG. 2.

Referring to FIG. 3, a block diagram illustrates an example architecture of the transfer network 210 of FIG. 2. In this example implementation of the transfer network 201, a generator architecture is implemented with a Dilated ResNet (DRN) architecture for the generators. It is understood that a separate generator architecture may be separately trained and used for each different facial component that is received from the face parsing network 210. Dilated convolution increases the receptive fields of the deeper network layers while maintaining the spatial resolution to avoid information loss. DRN utilizes the high-resolution feature maps to preserve image details. Its degridding layers can further improve the accuracy of spatial predictions.

The generator network includes three (3) dilated residual blocks, and two (2) degridding layers at the end of the network to avoid artifacts in the generated results. The generator 220 includes two (2) inputs, namely the reference face image and the target face image. The reference face image includes a parsed facial component such as the right eye region and the target face image includes a parsed facial component such as the right eye region. Instead of directly generating output pixels, the generator network 220 calculates the delta image which can be added to the target face image to obtain the final output. In this manner, the original skin tone and lighting environment are maintained in the target face image and only the makeup is transferred as an add-on layer to the target face image. This is an improvement over conventional approaches where the skin tone on the target face image may not be maintained around the facial component where the makeup is transferred. This improved transfer network 210 maintains the skin tone of the target face image. The transfer network 220 is trained to predict the delta between the target face image and the reference face image and output the delta, which is then applied to the target face image. The transfer network 220 or a separate transfer network performs the same function for each input facial component for which makeup is desired to be transferred.

Referring back to FIG. 2, the blending network 230 receives the target face image facial components on which the makeup has been transferred by the transfer network 220. The blending network 230 is configured to blend the target face image components with the makeup onto the original target face image. The blending network 230 uses the mask generated by the face parsing network 210 to insert the facial component from the transfer network 220 onto the target face image. In some implementations, one or more image processing techniques are used to blend in the facial component into the target face image so that the skin color is blended uniformly from the transferred facial component to the rest of the existing face.

The output of the blending network 230 is the target face image with the makeup that has been transferred from the reference face image. The target face image and the reference face image right eye regions, the left eye regions, and the lip regions are parsed, the makeup is transferred from the reference face image to the target face image for the facial component regions, and the target face image component regions are with the makeup are blended back onto the target face image. The target face image with the makeup is output from the neural network 116 and the makeup transfer tool for display on the user interface 112.

Figure 4:
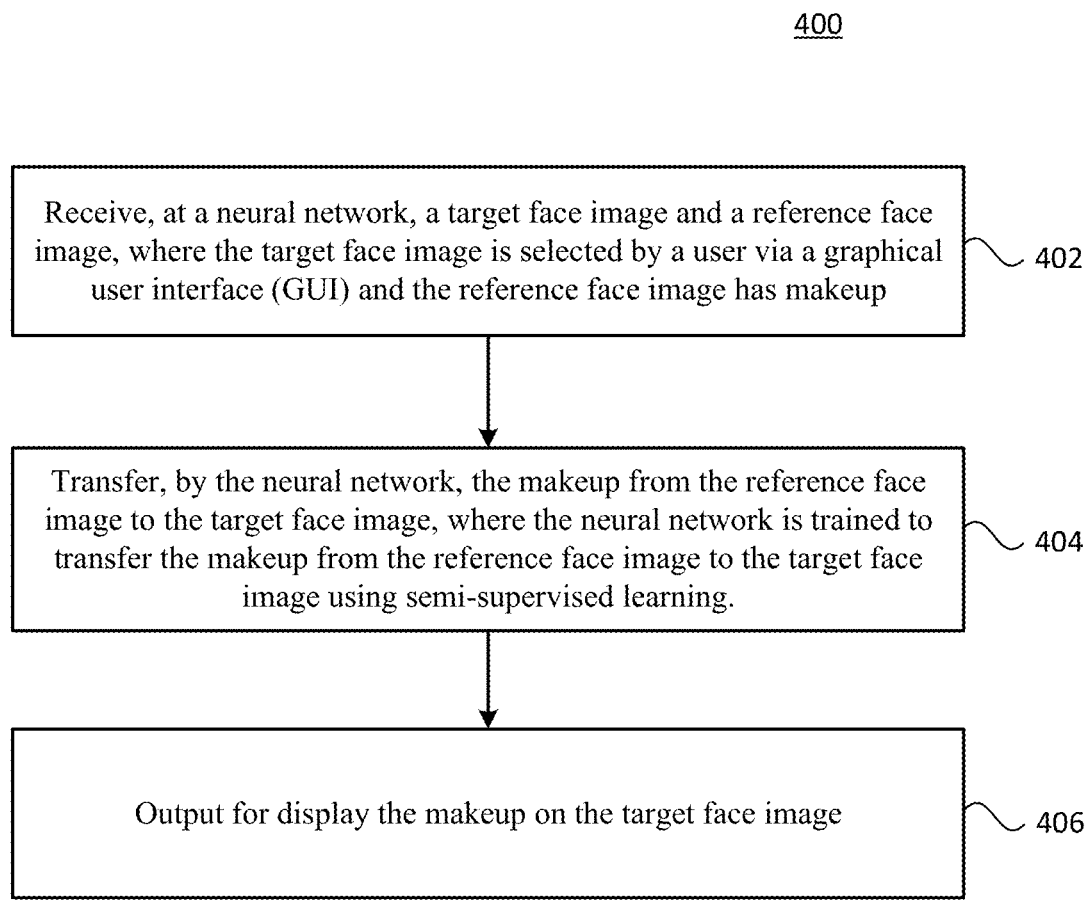
FIG. 4 is a flowchart illustrating example operations of the system of FIG. 1.

Referring to FIG. 4, an example process 400 illustrates example operations of the system 100 of FIG. 1. More specifically, process 400 illustrates an example of a computer-implemented method to automatically transfer makeup from a reference face image to a target face image. Instructions for the performance of process 400 may be stored in the at least one memory 104 and executed by the at least one processor 106 on the computing device 102. The instructions for the performance of process 400 may cause the at least one processor 106 to implement the application 108 and its components.

Process 400 includes receiving, at a neural network, a target face image and a reference face image, where the target face image is selected by a user via a graphical user interface (GUI) and the reference face image includes makeup (402). For example, the neural network 116 of FIG. 1 receives a reference face image having makeup and a target face image having no makeup. The target face image may be selected by a user via the user interface 112. The reference face image also may be selected by a user via the user interface 112. Additionally and/or alternatively, the reference face image may be provided by the makeup transfer tool 114 as one of several default or pre-defined reference makeup images that are stored in the at least one memory 104. Thus, these options are an improvement over conventional makeup transfer applications, which may enable the user only to input the target face image and not the reference face image. Additionally, the reference face image may be an arbitrary face image, where the selected reference face image by the user is not one of a set of pre-selected reference face images that were used to train the network.

Process 400 includes transferring, by the neural network, the makeup from the reference face image to the target face image, where the neural network is trained to transfer the makeup from the reference face image to the target face image using semi-supervised learning (404). As used herein, the term "semi-supervised learning" refers to the training of a neural network using both paired data and unpaired data with the paired data used to train the network using supervised learning and the unpaired data used to train the network using unsupervised learning. For example, the neural network 116 is configured to transfer the makeup from the reference face image to the target face image. The neural network 116 is trained to transfer the makeup from the reference face image to the target face image using semi-supervised learning, as discussed in more detail below, which maintaining the skin tone of the target face image.

Further, as discussed above with reference to FIGS. 2 and 3, the neural network 116 includes the components illustrated in FIGS. 2 and 3 to perform the automatic transfer of the makeup.

In some implementations, the neural network 116 includes a trained neural network (or model) for each facial component region for which the makeup is to be transferred. Each trained neural network may be trained using semi-supervised learning. For instance, the neural network 116 may include one neural network trained to transfer makeup from the lip region of the reference face image to the lip region of the target face image. The neural network 116 may include a different neural network trained to transfer makeup from the right eye region of the reference face image to the right eye region of the target face image. Further, the neural network 116 may include a different neural network trained to transfer makeup from the left eye region of the reference face image to the left eye region of the target face image. The neural network 116 may include other neural networks trained to transfer makeup from other regions of the reference face image to the corresponding region of the target face image. In some implementations, the neural network 116 may include one neural network that is trained to transfer makeup for both eye regions.

Process 400 includes outputting for display the makeup on the target face image (406). For example, the neural network 116 outputs the target face image having the makeup that was transferred from the reference face image. The output may be displayed on the user interface 112.

In some implementations, receiving, at the neural network, the reference face image includes receiving, at the neural network, both a first reference face image and a second reference face image. The first reference face image may have a first reference facial component with makeup selected by the user via the GUI and the second reference image may have a second reference facial component with makeup selected by the user via the GUI. In this manner, the neural network transfer the makeup from the first reference facial component and the second reference facial component to the target face image.

Figure 5:
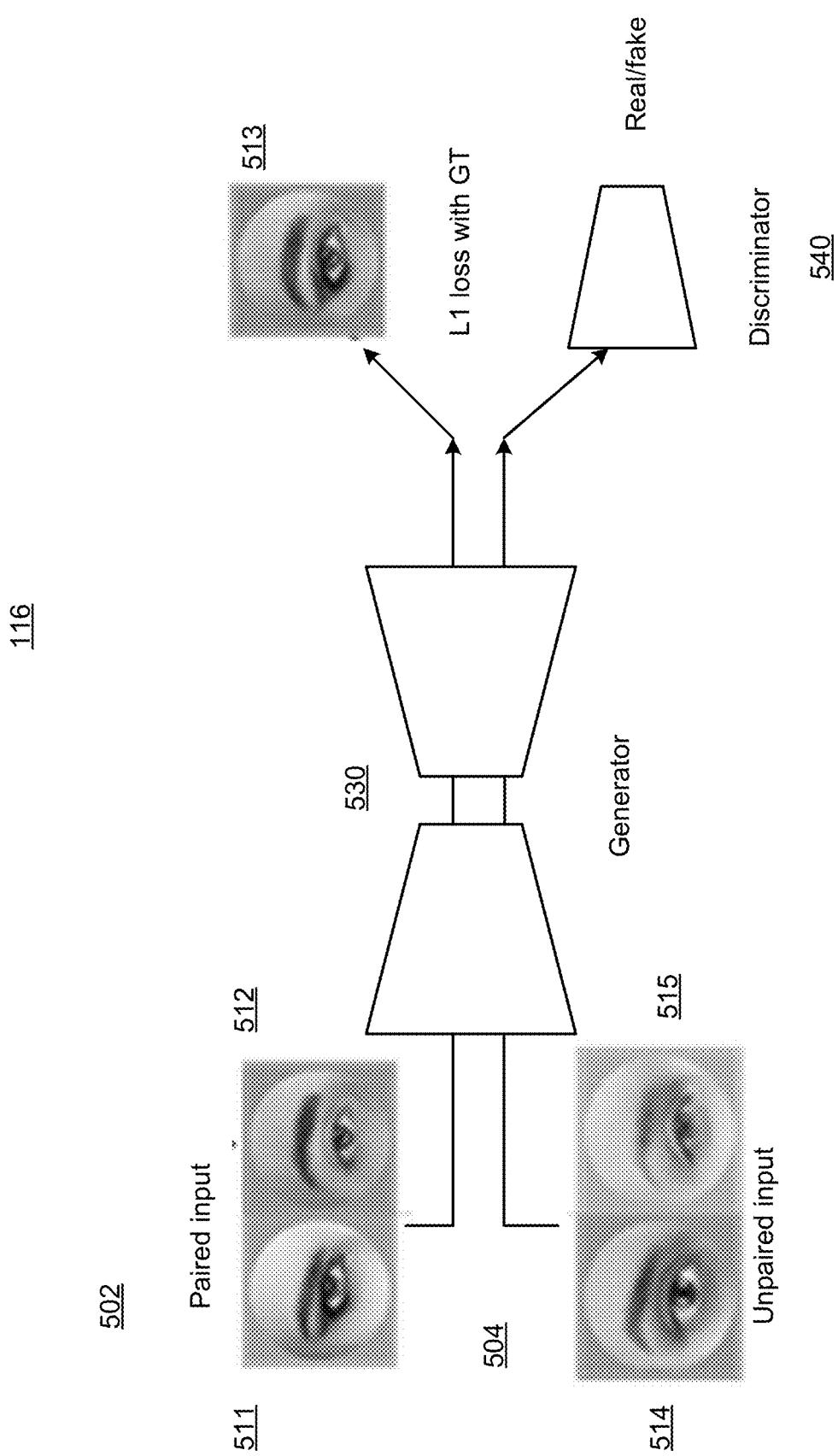
FIG. 5 is an example block diagram illustrating an example architecture for training the neural network of FIG. 1
Figure 6:
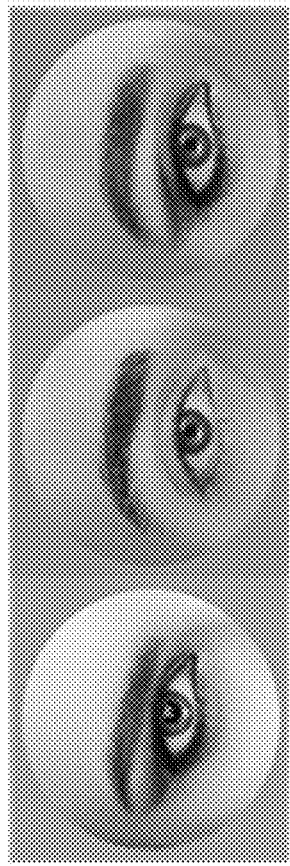
FIG. 6 are example images illustrating paired data and unpaired data.
Figure 6:
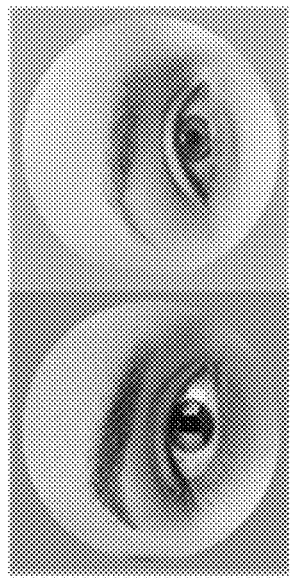

Referring to FIG. 5, an example architecture for training the neural network 116 using semi-supervised learning is illustrated. The semi-supervised learning uses a relatively small number of paired data 502 as input compared to a relatively large number of unpaired data 504 as input. Referring also to FIG. 6, an example of the paired data 502 and the unpaired data 504 are illustrated. As used herein, the term "paired data" refers to training data that is used to train the neural network that includes three selected images having a same identity and a same alignment, where the selected images include a training reference face image with makeup 511, a training target face image without makeup 512, and the training target face image with the makeup 513. In some implementations, the training target face image with the makeup 513 may include the makeup as hand drawn by an artist on the target face image.

As used herein, the term "unpaired data" refers to training data that is used to train the neural network that includes two randomly selected images that may have a different identity and may have a different alignment, where the randomly selected images include a reference face image with makeup 514 and a training target face image without makeup 515.

As discussed above, the neural network 116 may include multiple, separately trained neural networks for each different facial component. In this example, the neural network is being trained to transfer make for the right eye region. In one implementation, the amount of paired data 502 includes approximately 50 pairs and the amount of unpaired data includes approximately 3000 pairs. In other example implementations, different amounts of paired and unpaired data may be used with the unpaired data being a relatively larger amount of data than the paired data.

First, the paired data 502 is input into the generator 530. The generator 530 may include the same architecture as the generator illustrated as part of the transfer network 220 in FIG. 3. The paired data 502 trains the generator 530 using supervised learning by comparing the L1 loss function generated with the known ground truth (GT) result of the target face image with the makeup 513. For each set of paired data 502, the residual output from the generator 530 is added to the target face image with no makeup 512 and then is compared to the GT, which is the target face image with the makeup 513. All sets of the paired data 502 are input and used to train the generator 530 before inputting the unpaired data 504 into the generator 530. Training the generator 530 with paired data 502 first provides for a good initialization of the parameters of the generator 530, which can then be fined tuned using the unpaired data 504.

Once the generator 530 is initialized using all of the paired data 502, the generator 530 is further trained and fine tuned using the unpaired data 504. Since there is no GT to tell what the output should look like for the unpaired data 504, an adversarial loss is used to drive the output to be as realistic as the reference makeup. A discriminator network 540, which is a type of generator adversarial network, is used to determine how realistic the output of the generator 530 is with the unpaired data 504. The discriminator network 540 is trained with the reference face image having the makeup and the discriminator network determines whether the output of the generator 530 is real or fake by comparing the output to the reference face image having the makeup.

The generator 530 is trained using the unpaired data 504 in subsets of the unpaired data 504. That is, not all of the unpaired data 504 is input into the generator 530 at the same time. Instead, the unpaired data 504 is divided into subsets and each subset is input into the generator 530 at one time. Once a subset of the unpaired data 504 has been processed by the generator 530, then another subset of the unpaired data 504 is input and processed. This process continues for each subset of the unpaired data 504 until all of the unpaired data 504 has been input and processed by the generator 530.

In some implementations, the unpaired data 504 is divided into subsets containing about 100 pairs. In other implementations, the unpaired data 504 is divided into subsets containing about 50 to 100 pairs. Such an incremental training strategy is demonstrated to work better in handling the imbalance issue between the amount of paired data 502 and unpaired data 504.

By training the neural network using a semi-supervised learning approach of both paired data and unpaired date, the neural network is better stabilized than conventional approaches that use only unsupervised training techniques to train the neural network. Additionally, the neural network trained via the semi-supervised learning realizes and achieves better makeup transfer effects from the reference face image to the target face image compared to conventional neural networks trained using only unsupervised learning.

First training the neural network with the paired data using supervised learning leads to a good initialization of the neural network compared to the neural network having to start learning from scratch. The good initialization obtained by using the paired data only provides the benefit of stabilizing the training for the next phase when the unpaired data are used to train the neural network.

Following the initialization of the neural network using only the paired data, the neural network is gradually trained further using subsets of the relatively large number of unpaired data. For instance, the number of unpaired data may be grouped into subsets of unpaired data and each subset is progressively input into the neural network to further train the neural network. While the amount of paired data and unpaired data is substantially imbalanced due to the relatively large number of unpaired data compared to the relatively small number of paired data, the incremental training strategy is demonstrated to be more effective than simply putting all paired data and unpaired data together for training.

Further, the neural network is trained using the semi-supervised learning in one single-direction meaning the neural network is trained to transfer makeup to a target face image having no makeup. That is, the neural network is trained to transfer makeup on a target face image from having no-makeup to having makeup. Unlike conventional techniques which train two neural networks, one for makeup transfer and one for makeup removal from a face image, together using fully, unsupervised learning, the semi-supervised learning techniques described herein train the neural network in one single-direction, which is a more efficient and simpler system that achieves much better makeup transfer results than the conventional techniques. The semi-supervised learning techniques for training the neural network for makeup transfer require less memory resources and less processing resources than the conventional techniques, all while providing improved makeup transfer results.

Figure 7A:
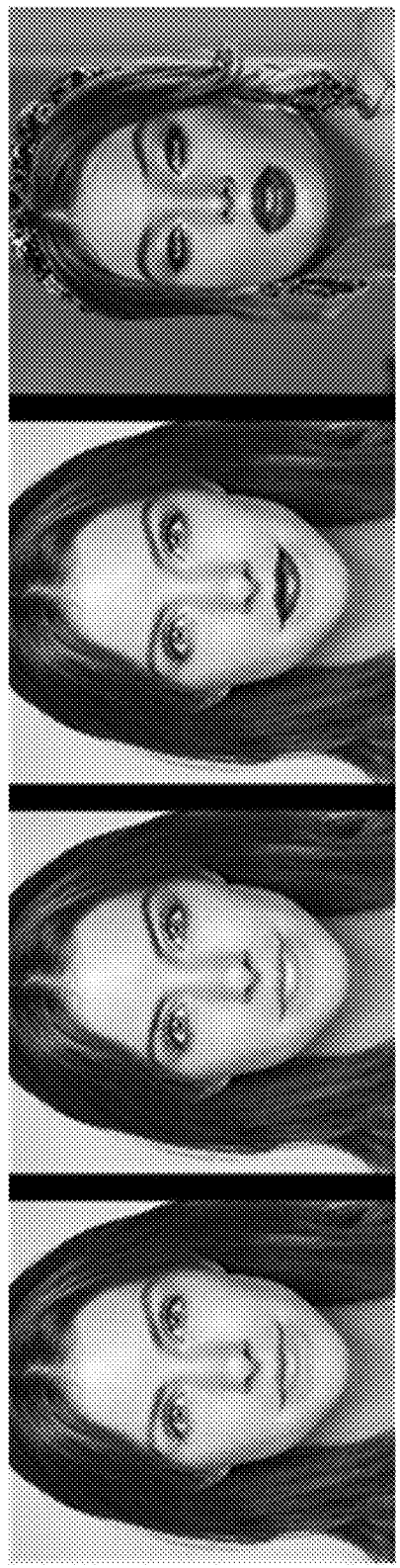
FIG. 7A are example images illustrating results for the transfer of makeup from a reference face image to target face image.

Referring to FIG. 7A, an example set of images 700 illustrates the results of an automatic transfer of the makeup from a reference face image 766 to a target face image having no makeup 760 using the makeup transfer tool 114 of FIG. 1 and the neural network 116 trained using semi-supervised learning. Image 762 is the result of a conventional system that attempted to automatically transfer the eye makeup and lip makeup from the reference face image 766 to the target face image 760. In the image 762, the makeup in the lip region did not transfer properly in the same color and the blending of the makeup around both the eye regions and the lip regions is not smooth. Image 764 illustrates the result of the makeup transfer using the makeup transfer tool 144 and the neural network 116. The makeup color in the lip region transferred much better in image 764 than in image 762. Additionally, the blending of the facial component regions is much smoother in image 764 than in image 762.

Figure 7B:
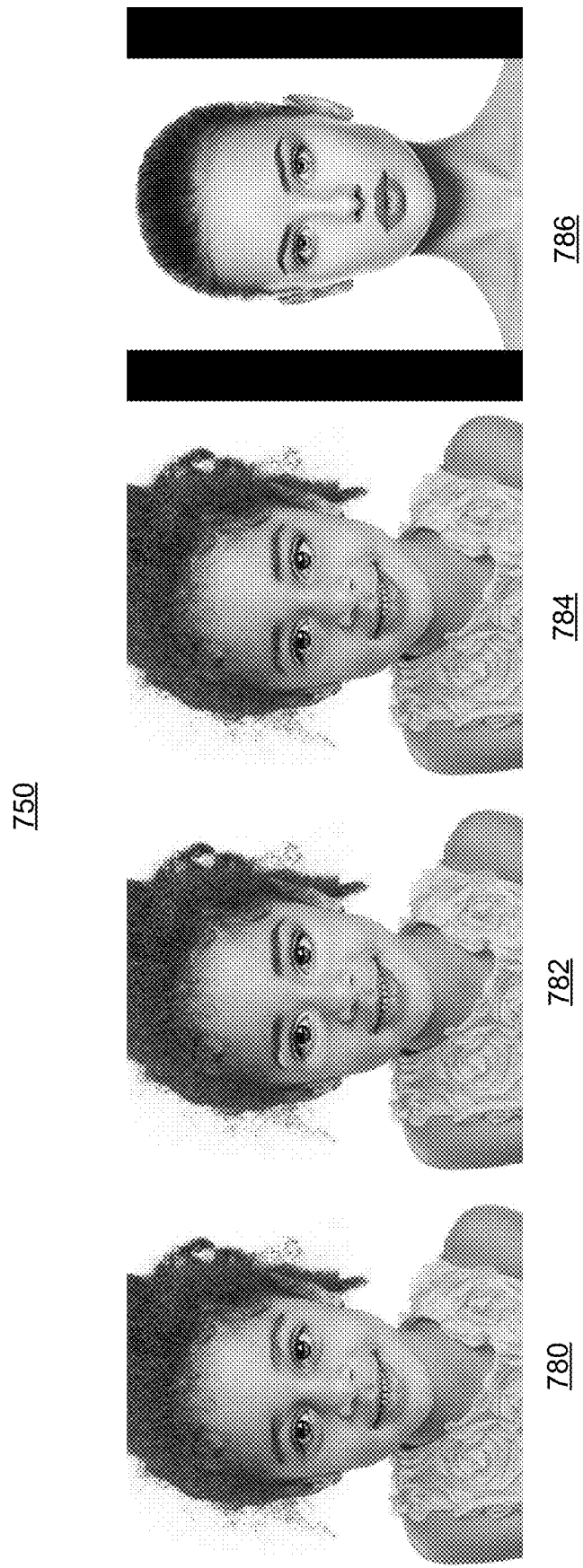
FIG. 7B are example images illustrating results for the transfer of makeup from a reference face image to a target face image.

Referring to FIG. 7B, an example set of images 750 illustrates the results of an automatic transfer of the makeup from a reference face image 786 to a target face image having no makeup 780 using the makeup transfer tool 114 of FIG. 1 and the neural network 116 trained using semi-supervised learning. Image 782 is the result of a conventional system that attempted to automatically transfer the eye makeup and lip makeup from the reference face image 786 to the target face image 780. In the image 782, the skin tone of the original target face image 780 is not maintained, as can be seen around the eye regions. Image 784 illustrates the result of the makeup transfer using the makeup transfer tool 144 and the neural network 116. The makeup color in the lip region transferred much better in image 784 than in image 782. Additionally, the blending of the facial component regions is much smoother in image 784 than in image 782 and the skin tone of the target face image is maintained around all of the facial component regions.

Figure 8:
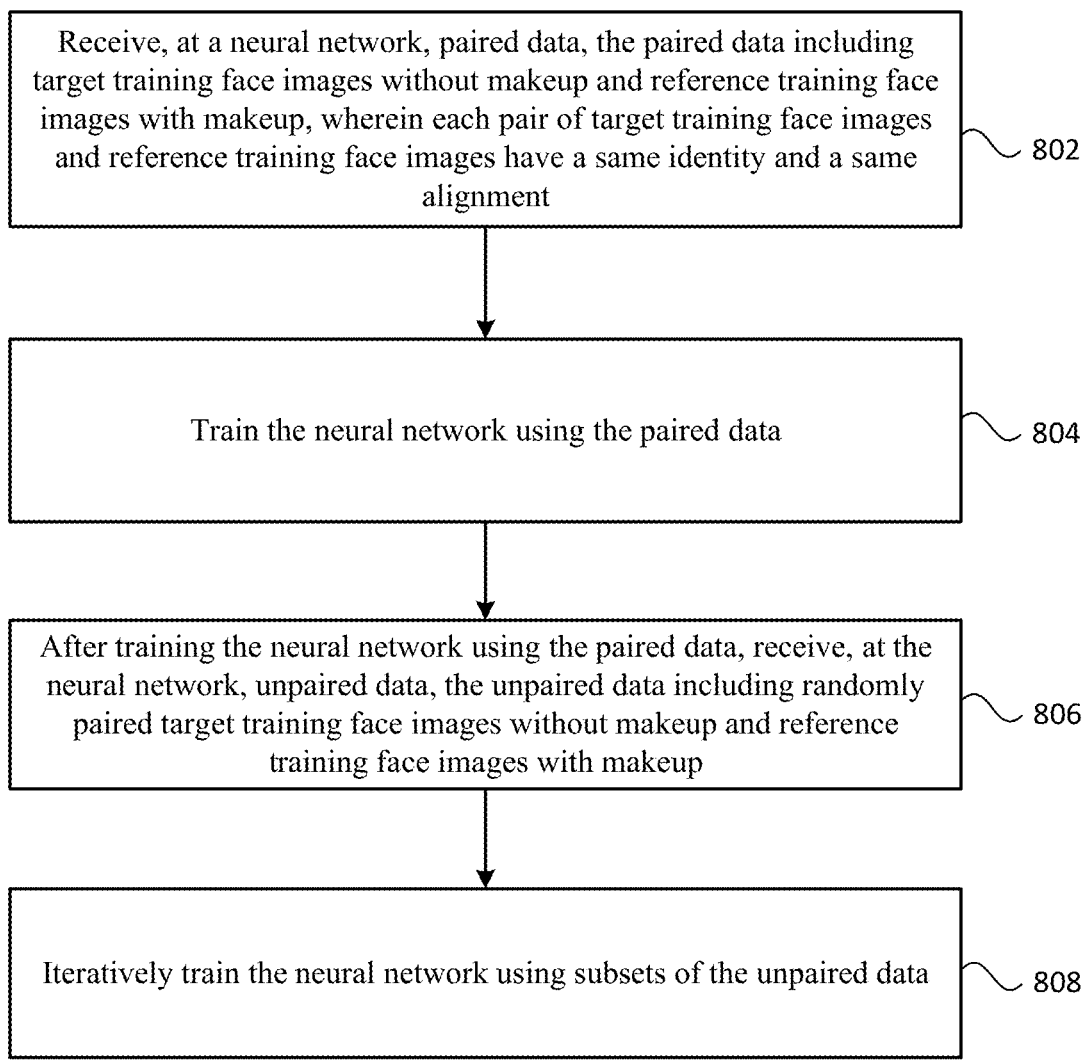
FIG. 8 is a flowchart illustrating example operations of the system of FIG. 5.

Referring to FIG. 8, an example process 800 illustrates example operations of training the neural network 116 of FIG. 1. More specifically, process 800 illustrates an example of a computer-implemented method to train a neural network to transfer makeup from a reference face image to a target face image. Instructions for the performance of process 800 may be stored in the at least one memory 104 and executed by the at least one processor 106 on the computing device 102. The instructions for the performance of process 800 may cause the at least one processor 106 to implement the application 108 and its components.

Process 800 includes receiving, at a neural network, paired data, the paired data including target training face images without makeup and reference training face images with makeup, where each pair of target training face images and reference training face images have a same identity and a same alignment (802). For example, the generator 503 receives the paired data 502 as input.

Process 800 includes training the neural network using the paired data (804). For example, the generator 503 trains the neural network using the paired data. Training the network using the paired data includes computing a first loss function between an output of the neural network and a ground truth (GT). First training the neural network with the paired data using supervised learning leads to a good initialization of the neural network compared to the neural network having to start learning from scratch. The good initialization obtained by using the paired data only provides the benefit of stabilizing the training for the next phase when the unpaired data are used to train the neural network.

Process 800 includes after training the neural network using the paired data, receiving, at the neural network, unpaired data, the unpaired data including randomly paired target training face images without makeup and reference training face images with makeup (806). For example, once the paired data 502 is processed by the generator 503, the generator 530 receives a subset of the unpaired data 504.

Finally, process 800 includes iteratively training the neural network using subsets of the unpaired data (808). For example, the generator 530 is trained using subsets of the unpaired data (808). Following the initialization of the neural network using only the paired data, the neural network is gradually trained further using subsets of the relatively large number of unpaired data. For instance, the number of unpaired data may be grouped into subsets of unpaired data and each subset is progressively input into the neural network to further train the neural network. While the amount of paired data and unpaired data is substantially imbalanced due to the relatively large number of unpaired data compared to the relatively small number of paired data, the incremental training strategy is demonstrated to be more effective than simply putting all paired data and unpaired data together for training.

Further, the neural network is trained using the semi-supervised learning in one single-direction meaning the neural network is trained to transfer makeup to a target face image having no makeup. That is, the neural network is trained to transfer makeup on a target face image from having no-makeup to having makeup. Unlike conventional techniques which train two neural networks, one for makeup transfer and one for makeup removal from a face image, together using fully, unsupervised learning, the semi-supervised learning techniques described herein train the neural network in one single-direction, which is a more efficient and simpler system that achieves much better makeup transfer results than the conventional techniques. The semi-supervised learning techniques for training the neural network for makeup transfer require less memory resources and less processing resources than the conventional techniques, all while providing improved makeup transfer results.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A non-transitory computer readable medium comprising instructions that, when executed by at least one processor, cause a computer device to:
receive, at a neural network, a target face image and a reference face image, the reference face image including makeup;
generate, by the neural network, a delta image based on the reference face image, wherein the delta image represents the makeup from the reference face image; and
transfer, by the neural network, the makeup from the reference face image to the target face image by combining the target face image with the delta image, wherein the neural network includes:
a face parsing network that is configured to parse the target face image and the reference face image into multiple facial components,
a transfer network that is trained to transfer the makeup from the reference face image to the target face image using the delta image while maintaining a skin tone and a lighting environment of the target face image, and
a blending network that is configured to blend the facial components of the target face having the makeup onto the target face image; and
output for display the makeup on the target face image.

2. The non-transitory computer readable medium of claim 1, wherein:
the instructions that, when executed by the at least one processor, cause the computer device to receive, at the neural network, the target face image and the reference face image, include instructions that, when executed by the at least one processor, cause the computer device to receive, at the neural network, the target face image and both a first reference face image and a second reference face image, the first reference face image having a first reference facial component with makeup selected by a user via a graphical user interface (GUI) and the second reference face image having a second reference facial component with makeup selected by the user via the GUI; and
the instructions that, when executed by the at least one processor, cause the computer device to transfer, by the neural network, the makeup from the reference face image to the target face image include instructions that, when executed by the at least one processor, cause the computer device to transfer, by the neural network, the makeup from the first reference facial component and the makeup from the second reference facial component to the target face image.

3. The non-transitory computer readable medium of claim 1, wherein the neural network is trained using a semi-supervised learning using both paired data and unpaired data, wherein the unpaired data is a larger dataset than the paired data.

4. The non-transitory computer readable medium of claim 3, wherein the neural network is trained using a semi-supervised learning by i) training the neural network using only the paired data using supervised learning and then ii) iteratively training the neural network using subsets of the unpaired data using unsupervised learning.

5. The non-transitory computer readable medium of claim 4, wherein:
training the neural network using only the paired data includes computing a first loss function between an output of the neural network and a ground truth (GT); and
iteratively training the neural network using the subsets of the unpaired data comprises computing a second loss function, wherein the second loss function is a different loss function than the first loss function.

6. The non-transitory computer readable medium of claim 5, wherein the first loss function includes a L I loss function and the second loss function includes an adversarial loss function using a generator adversarial network.

7. The non-transitory computer readable medium of claim 3, wherein the paired data includes a training reference face image with makeup, a training target face image without the makeup, and the training target face image with the makeup, wherein the training reference face image and the training target face image have a same identity and a same alignment.

8. The non-transitory computer readable medium of claim 3, wherein the unpaired data includes a training reference face image with makeup and a training target face image without the makeup, wherein the training reference face image and the training target face image are randomly paired face images.

9. The non-transitory computer readable medium of claim 3, wherein:
the paired data includes 50 pairs of the paired data; and
the unpaired data includes 3000 pairs of the unpaired data.

10. The non-transitory computer readable medium of claim 1, wherein the neural network comprises:
a first model that is trained to transfer the makeup from a lip region of the reference face image to a lip region of the target face image using a semi-supervised learning; and
a second model that is trained to transfer the makeup from an eye region of the reference face image to an eye region of the target face image using the semi-supervised learning.

11. A system comprising:
at least one processor; and
a non-transitory computer readable medium comprising instructions that, when executed by the at least one processor, cause the system to:
receive, at a neural network, paired data, the paired data including target training face images without makeup and reference training face images with makeup, wherein each pair of target training face images and reference training face images have a same identity and a same alignment;
receive, at the neural network, unpaired data, the unpaired data including randomly paired target training face images without makeup and reference training face images with makeup; and train the neural network using a semi-supervised learning by using the paired data for a supervised learning phase and using the unpaired data for an unsupervised learning phase.

12. The system of claim 11, wherein the instructions that, when executed by the at least one processor, cause the system to train the neural network using the unpaired data include instructions that, when executed by the at least one processor, cause the system to iteratively train the neural network using subsets of the unpaired data.

13. The system of claim 12, wherein:
the instructions that, when executed by the at least one processor, cause the system to train the neural network using the paired data include instructions that, when executed by the at least one processor, cause the system to compute a first loss function between an output of the neural network and a ground truth (GT); and
the instructions that, when executed by the at least one processor, cause the system to iteratively train the neural network using the subsets of the unpaired data include instructions that, when executed by the at least one processor, cause the system to compute a second loss function, wherein the second loss function is a different loss function than the first loss function.

14. The system of claim 13, wherein the first loss function includes a L1 loss function and the second loss function includes an adversarial loss function using a generator adversarial network.

15. The system of claim 11, wherein the unpaired data is a larger dataset than the paired data.

16. A computer-implemented method for training a neural network to automatically transfer makeup from a first image to a second image, the method comprising:

receiving, at a neural network, paired data, the paired data including target training face images without makeup and reference training face images with makeup, wherein each pair of target training face images and reference training face images have a same identity and a same alignment;

receiving, at the neural network, unpaired data, the unpaired data including randomly paired target training face images without makeup and reference training face images with makeup; and iteratively training the neural network using a semi-supervised learning by using the paired data for a supervised learning phase and subsets of the unpaired data for an unsupervised learning phase.

17. The computer-implemented method of claim 16, wherein training the neural network using the paired data includes computing a first loss function between an output of the neural network and a ground truth (GT).

18. The computer-implemented method of claim 17, wherein iteratively training the neural network using the subsets of the unpaired data includes computing a second loss function, wherein the second loss function is a different loss function than the first loss function.

19. The computer-implemented method of claim 18, wherein the first loss function includes a L1 loss function and the second loss function includes an adversarial loss function using a generator adversarial network.

20. The computer-implemented method of claim 16, wherein the unpaired data is a larger dataset than the paired data.

* * * * *